US006762512B2

(12) United States Patent
Nelson

(10) Patent No.: US 6,762,512 B2
(45) Date of Patent: Jul. 13, 2004

(54) METHODS FOR STARTING A COMBUSTION TURBINE AND COMBUSTION TURBINE GENERATOR CONFIGURED TO IMPLEMENT SAME METHODS

(75) Inventor: Robert J. Nelson, Orlando, FL (US)

(73) Assignee: Siemens Westinghourse Power Corporation, Orlando, FL (US)

( * ) Notice: Subject to any disclaimer, the term of this patent is extended or adjusted under 35 U.S.C. 154(b) by 167 days.

(21) Appl. No.: 10/143,281

(22) Filed: May 10, 2002

(65) Prior Publication Data

US 2003/0209910 A1 Nov. 13, 2003

(51) Int. Cl.[7] .............................................. F02C 6/00
(52) U.S. Cl. ...................... 290/52; 290/40 R; 322/10
(58) Field of Search ............................ 290/52, 40 R; 320/10

(56) References Cited

U.S. PATENT DOCUMENTS

| | | | | |
|---|---|---|---|---|
| 3,951,008 A | * | 4/1976 | Schneider et al. | ............. 74/661 |
| 4,336,486 A | | 6/1982 | Gorden et al. | ................ 322/63 |
| 5,068,590 A | * | 11/1991 | Glennon et al. | .............. 322/10 |
| 5,103,629 A | * | 4/1992 | Mumford et al. | ............. 60/778 |
| 5,252,860 A | * | 10/1993 | McCarty et al. | .......... 290/40 R |
| 5,521,444 A | * | 5/1996 | Foreman | ..................... 307/104 |
| 5,594,322 A | * | 1/1997 | Rozman et al. | ............... 322/10 |
| 6,285,089 B1 | | 9/2001 | Nelson | ........................ 290/52 |

FOREIGN PATENT DOCUMENTS

JP          10121908 A    *  5/1998    ........... F01D/25/36

* cited by examiner

*Primary Examiner*—Joseph Waks

(57) ABSTRACT

A method for starting a combustion turbine generator 10 includes configuring the generator so that the generator's rotor 16 is connected to receive all DC electrical power from the armature 30 of a DC-field brushless exciter 20 after rectification by a rotating rectifier. The method also includes causing the DC-field brushless exciter 20 to provide all of the DC electrical power to the rotor 16 by rotating a shaft 12 with a turning gear 22 to drive the DC-field brushless exciter 20 and rotor 16. The method further includes supplying electrical power to the generator's stator 18 as the shaft 12 is rotating so that the stator 18 provides an accelerating torque to operate as a synchronous motor to bring the rotational speed of the shaft 12 up to a starting rotational speed. A combustion turbine generator includes a starting controller 28 to control the rotational speed of the shaft 12 and the supply of electrical power to the stator 18.

17 Claims, 6 Drawing Sheets

METHODS FOR STARTING A COMBUSTION TURBINE AND COMBUSTION TURBINE GENERATOR CONFIGURED TO IMPLEMENT SAME METHODS

FIELD OF THE INVENTION

The present invention relates generally to power generators, and, more particularly, to combustion turbine generators and methods for their starting.

BACKGROUND OF THE INVENTION

Combustion turbine generators are widely used by electric power utilities to generate electricity. A combustion turbine power generator includes an electrical generator and a combustion turbine for driving the generator. The generator includes a rotor surrounded by a stator, electrical power being generated as the rotor turns within the stator. The combustion turbine drives the generator by turning a shaft connected to the rotor. The shaft is turned by an expansion of hot gas within the turbine. Air enters an inlet, is compressed by an air compressor, and then supplied to a combustor where fuel (e.g., natural gas) is burned to produce hot gas. The hot gas travels through the turbine where the expanding gas drives the shaft to turn the rotor.

The generator needs to be excited in order to create magnetic flux necessary for the generation of electrical power. An exciter, such as a brushless DC-field exciter, can provide the necessary excitation power. An exciter typically includes a rotating armature connected to the shaft and a field surrounding the armature. As the turbine turns the shaft, the shaft rotates the armature within the surrounding field to provide a current to the rotor.

A conventional combustion turbine power generator typically lacks a self-starting capability. Starting thus requires a motor or other external device to increase the rotation of the shaft up to a rotational speed at which the turbine can take over and drive the shaft.

A static start system can be employed for the static start of a conventional combustion turbine power generator. This technique employs a Static Frequency Converter (SFC) to provide three-phase ac power of variable frequency and magnitude to a generator stator while an excitation system simultaneously provides dc excitation to the field winding. The synchronous generator is operated as a synchronous motor. As the stator frequency is increased, the shaft accelerates to maintain synchronism, until ignition speed for the combustion turbine system is attained. Present static start systems use static excitation systems, employing slip rings and carbon brushes to provide dc excitation power. Another starting system is disclosed in one of the coinventor's own patents, U.S. Pat. No. 6,285,089 B1, which has the same assignee as the present invention. The patent discloses an alternating current (AC) induction exciter that provides excitation to the rotor regardless of the rotational speed of the shaft and without the use of slip rings or brushes. Nonetheless, a conventional combustion turbine generator may not be equipped with the AC induction exciter.

It is generally thought that static starting is not possible with a generator that uses a brushless DC-field exciter unless a separate set of slip rings and brushes is used to provide excitation to the rotor during starting. It is costly, though, to install and maintain slip rings and brushes. It is costly as well, to maintain a separate starting supply. Moreover, the use of a starting static excitation system introduces mechanical concerns related to vibration and operation.

SUMMARY OF THE INVENTION

With the foregoing background in mind, it is therefore an object of the present invention to provide methods for starting a combustion turbine power generator using a DC-field exciter and without slip rings or brushes.

This and other objects, features, and advantages in accordance with the present invention are provided by a method of starting a combustion turbine power generator by rotating the generator's shaft to cause a shaft-driven DC-field exciter to supply all the DC power to the generator rotor field winding and by supplying electrical power to the generator's stator with, for example, a static frequency converter. The result is an electrical torque on the shaft that increases the rotating speed of the shaft. The torque accelerates the rotation of the shaft thereby increasing field current supplied by the brushless exciter, thereby increasing the power supplied to the rotor, the increased power causing continued acceleration until the combustion turbine is rotating at a ignition speed.

More particularly, the combustion turbine power generator will include a shaft and a combustion turbine for driving the shaft. A turning gear may be used for rotating the shaft when it is not being driven by the turbine so as to effectively eliminate warping of the shaft. The combustion turbine power generator also typically includes a rotor connected to the shaft and a stator surrounding the rotor. A DC-field exciter comprising an armature connected to the shaft and a field surrounding the armature may also be part of the combustion turbine power generator.

The method may include configuring the combustion turbine power generator so that the rotor is connected to receive all DC electrical power needed for starting from the armature of the DC-field exciter. This configuring of the turbine power generator, accordingly, may include making the rotor to be devoid of brushes or slip rings, or simply not using the brushes or slip rings if the rotor already includes same.

The turning gear of the combustion turbine power generator may have a nominal rotational speed and an upper rotational speed. The method of starting the combustion turbine power generator may therefore include increasing the rotational speed of the shaft from the nominal rotational speed to the upper rotational speed. The turning gear may turn the shaft, thereby rotating the brushless DC-field exciter and causing it to generate a direct current in the generator rotor and a corresponding magnetic flux in the gap between the generator rotor and stator. As the speed increases, so does the field current and, hence, the magnetic flux.

Electrical power may be supplied to the stator as the shaft is rotating. The result is a stator current that also produces a corresponding magnetic flux. The magnetic flux from the rotor and the magnetic flux from the stator interact to create a torque on the shaft to increase its speed.

A field voltage may be applied to the DC-field exciter once the shaft reaches the upper rotational speed. The turning gear may then be disengaged. As the shaft rotates, electrical power may be supplied to the stator when the rotational speed of the shaft has reached the upper rotational speed.

The combustion turbine power generator may have a maximum start time. Accordingly, electrical power may be supplied to the stator so that the shaft reaches the starting rotational speed before the maximum start time. Current through the stator may give rise to an internal stator voltage. Accordingly, the electrical power also may be supplied to the stator so as to avoid an "over-excitation" or "over-fluxing" (i.e. excessive Volts/Hertz) condition of the stator, while still providing sufficient torque to accelerate or spin the rotor at a given speed, as appropriate.

Another aspect of the invention pertains to a combustion turbine power generator configured to implement the methods of starting already described. The combustion turbine generator may include a shaft, a combustion turbine for driving the shaft, a rotor connected to the shaft, a stator surrounding the rotor, and a DC-field exciter comprising an armature connected to the shaft and a dc field winding surrounding the armature. A turning gear may be used to rotate the shaft. The combustion turbine generator also may include a stator power supply that supplies electrical power to the stator during starting.

A starting controller may be connected to the turning gear and to the stator power supply. The starting controller may control the turning gear to rotate the shaft so that the DC-field exciter provides all DC electrical power to the rotor. The starting controller also may also control the stator power supply so that electrical power is supplied to the stator as the shaft is rotating.

DETAILED DESCRIPTION OF THE PREFERRED EMBODIMENTS

The present invention will now be described more fully hereinafter with reference to the accompanying drawings, in which, preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
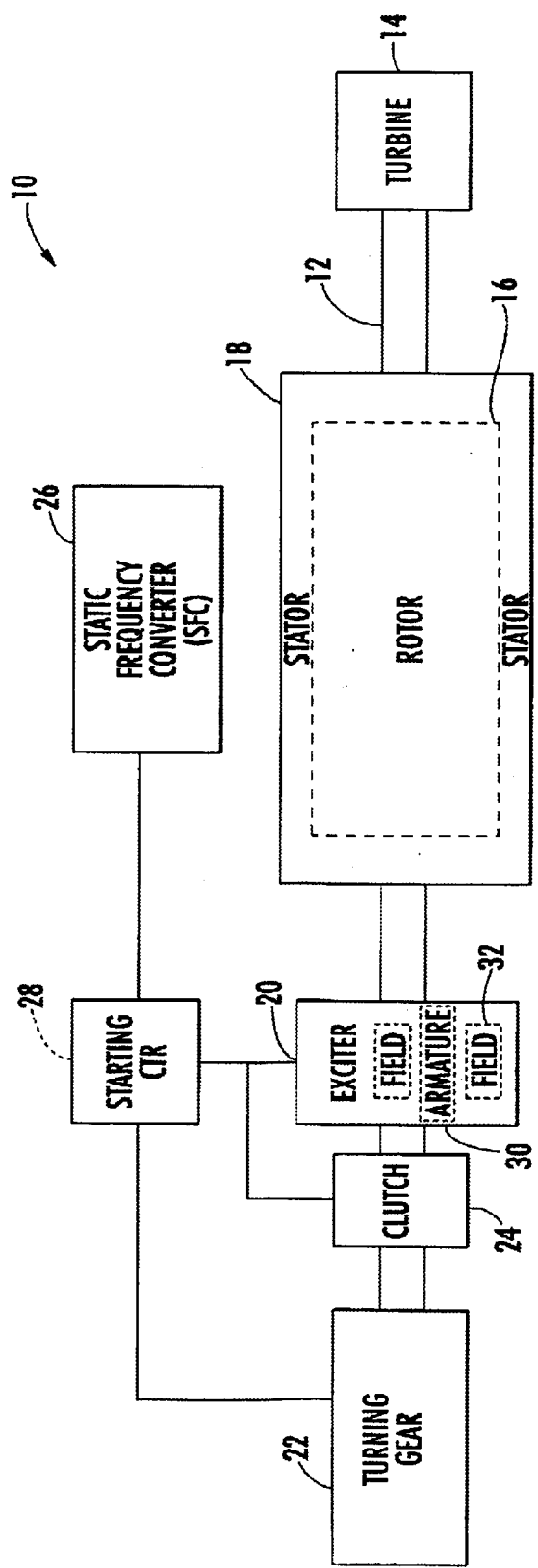
FIG. 1 is a schematic block diagram of a combustion turbine power generator according to the invention.
Figure 2:
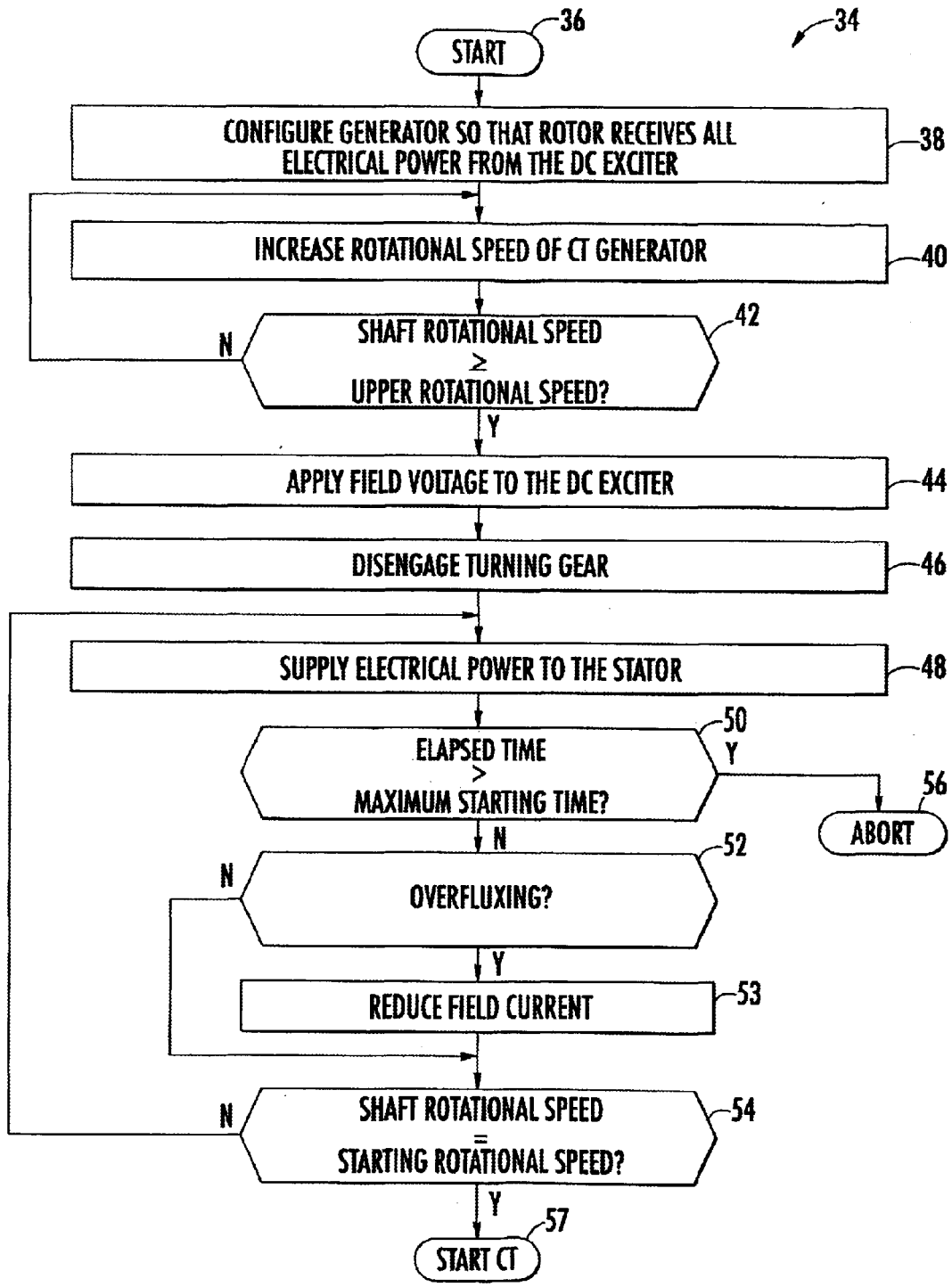
FIG. 2 is a flow chart of a method for starting the combustion turbine power generator of FIG. 1.

Referring initially to FIGS. 1 and 2, a method of starting a combustion turbine power generator 10 in accordance with the invention is described. The combustion turbine power generator 10 illustratively includes a shaft 12 and a combustion turbine 14 for driving the shaft when operating. The combustion turbine power generator 10 also includes a rotor 16 driven by the shaft and a stator 18 surrounding the rotor. A DC-field exciter 20 is driven by the shaft 12 to thereby provide DC power to the rotor. The combustion turbine power generator 10 further includes a turning gear 22 for rotating the shaft 12 when the power generator is off. The combustion turbine power generator 10 also includes a clutch 24 to engage the turning gear for rotating the shaft 12.

Ordinarily, when the combustion turbine power generator 10 is not being used to supply power, the turning gear 22 will be engaged to rotate the shaft so as to reduce a tendency of the shaft to warp. The rotation is typically at a nominal rotational speed.

As already noted, the DC-field exciter 20 is driven by the shaft 12. The DC-field exciter 20 comprises a rotating armature 30 mounted on the shaft 12 with a stationary dc field 32 surrounding the rotating armature. The DC-field exciter 20 may be a brushless DC-field exciter as will be readily understood by those skilled in the art. As the turning gear 22 turns the shaft 12, the rotating armature 30 rotates within the stationary field 32 generating an alternating current. The alternating current can be converted to direct current by, for example, a diode wheel rectifier, not shown, mounted to the shaft 12. The direct current is supplied to the rotor 16 to excite the generator as will be readily understood by those skilled in the art. When the generator 10 is off and the turning gear 22 is rotating the shaft 12 at the nominal rotational speed, the generator rotor current produced by the exciter 20 is accordingly also low.

As illustrated in the flow chart 34, the method of starting the combustion turbine power generator 10 includes, after start (Block 36), the configuring of the generator so that the rotor 16 is connected to receive all DC electrical power needed during starting from the armature 30 of the DC-field exciter 20 (Block 38). Configuring may comprise configuring the rotor 16 to be devoid of starting brushes and slip rings. The ensuing steps explained hereinafter, however, are equally applicable for starting a combustion turbine already so configured. Thus, in an alternate embodiment, the invention provides a method for starting a combustion turbine power generator already configured so that the rotor 16 is connected to receive all DC electrical power from the armature 30 of the DC-field exciter 20, including for example a combustion turbine devoid of starting brushes and slip rings.

With the combustion turbine power generator 10 configured so that the rotor 16 receives all DC electrical power from the DC-field exciter 20, the shaft 12 is rotated with the turning gear 22 to cause the DC-field exciter to provide all of the DC electrical power to the rotor. The shaft 12 can have an upper turning gear speed greater than the nominal turning gear speed. Accordingly, at Block 40, the rotational speed of the shaft 12 is increased by increasing the rotational speed at which the turning gear 22 is turning the shaft.

As will be readily understood by those skilled in the art, the generator rotor current provided to the rotor 16 from the exciter 20 increases in response to increases in the rotational speed of the shaft 12. Accordingly, by increasing the rotational speed of the shaft 12 using the turning gear 22, the generator rotor current is increased. At Block 42, the rotational speed of the shaft 12 is increased using the turning gear 22 to an upper rotational speed, thereby producing increased current and corresponding magnetic flux.

At Block 44 a field voltage is applied to the DC-field exciter 20 substantially concurrently with electrical power being supplied to the stator 18 as the shaft is rotating. Illustratively, the field voltage is applied when the turning gear 22 turning the shaft 12 reaches the upper rotational speed. Under various operating conditions, though, as will be readily appreciated by those skilled in the art, the upper rotational speed is not necessarily a limited speed and can vary depending on operating conditions.

The turning gear 22 is disengaged once the turning gear 22 reaches the upper rotational speed (Block 46). The turning gear 22 is disengaged with the clutch 24. Electrical power is supplied at Block 48 to the stator 18 from a stator power supply, which illustratively is provided by a static frequency converter 26, connected to the stator. Electrical power is supplied by supplying an electrical current from the static frequency converter 26 to the stator 18 to thereby generate a stator current in the stator. As will be readily apparent to those skilled in the art, other power supply devices may also be used. The stator current also produces a corresponding magnetic flux that interacts with the magnetic flux produced by the generator rotor current so that the generator acts as a motor.

As the rotating speed of the shaft 12 increases, the generator rotor current increases as well. The increase in generator rotor increases the strength of the magnetic flux with the result that the rotational speed of the shaft 12 increases even more until ultimately the rotational speed of the shaft is at the starting rotational speed for the combustion turbine 14. Once the shaft 12 has reached the starting rotational speed, the combustion turbine 14 can take over and drive the shaft. The stator power supply 26 is disconnected, and the power generator can begin supplying electrical power.

The combustion turbine has a maximum starting time. Accordingly, power is supplied to the stator (Block 48) so that the shaft desirably reaches the starting rotational speed before the maximum start time (Block 50). If so, the combustion turbine 14 is started at Block 57. If for some reason the starting is not achieved in the maximum time, the starting process can be aborted (Block 56). Power is also supplied so as to avoid an over-excitation or over-fluxing (i.e., excessive Volts/Hertz) condition in the stator 18. If such condition occurs, as determined at Block 52, the starting process may also be aborted or the field voltage may simply be reduced by the practice of "field weakening" as will be well understood by those skilled in the art.

The illustrative calculations below are provided to demonstrate that it is possible to employ static start with a synchronous generator without the use of slip rings, provided that the generator rotor can be rotated at a sufficient speed to insure that adequate exciter voltage is generated to provide enough rotor flux for an initial torque that exceeds a generator damping torque. This torque increases directly with rotor speed, if constant generator excitation can be maintained. Although the system described may not exactly match the capability of a comparable system with static excitation (which can have substantial generator rotor excitation applied at standstill and hence a higher available torque at low speed), it appears possible to approach the capability of the system with static excitation by appropriate design. Most importantly, the system appears to satisfy the performance requirements of commercially available combustion turbine generators in North America.

The illustrative calculations are for a normal combustion turbine generator having a capability in excess of 200 MW and generator terminal voltage, Vt, of 16 kV line-to-line with a brushless exciter and 100 rpm turning gear. The method was used to simulate the performance of a starting system that uses a static frequency converter and static excitation. The simulation was then modified to account for use of a brushless exciter.

Figure 3:
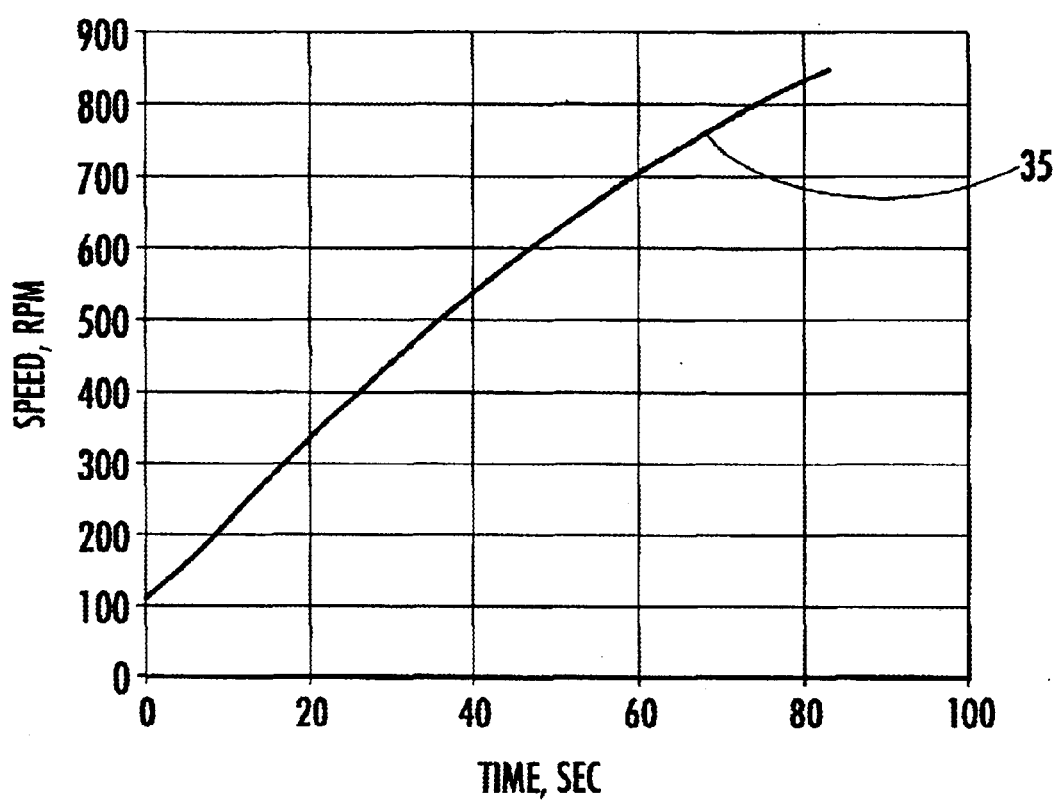
FIG. 3 is a plot of rotational speeds of a generator shaft versus time during an actual starting test representative of values used according to the present invention.

The curve 35 shown in FIG. 3 represents rotational speed of the generator shaft as the speed increases with time during an actual starting test. For this turbine, ignition speed occurs at roughly 850 rpm from an initial rotational speed of 100 rpm. The starting process was then simulated by writing the equation of motion for the shaft system and determining appropriate coefficients from the test results. The equation of motion is:

$$Telec = J d\omega/dt + D\omega^2,$$

where Telec=Electric torque provided by interaction of magnetic fluxes produced by static frequency converter (SFC) current in the stator and excitation current in the rotor;

J=rotor shaft inertia (sum of inertias for turbine, generator, exciter or collector, turning gear coupling, gear box, if applicable, etc.)

$\omega$=speed of rotation (rad/sec or rpm); and

D=rotor system damping torque coefficient (related to turbine compressor windage, generator windage, bearings, etc.).

Although this is a simplified model and neglects certain second-order effects, such as generator winding losses and eddy losses in the rotor surface, it has been observed to be sufficiently accurate for the purpose of estimating sizing requirements.

Telec, the electrical torque, was estimated from the electric power input to the generator stator during starting:

$$Telec = Pelec/\omega = K \times \sqrt{3} \times Isfc \times Ei/\omega,$$

where Isfc=the stator current per phase supplied by the SFC;

Ei=the internal electromotive force provided by rotation of the excited rotor (Ei=Irotor/IFNL×$\omega$/377×Vt for a 3600 rpm synchronous generator, where Irotor is the field current supplied to the generator rotor); and K=a proportionality constant that is a function of units, the phase angle difference between Ei and Isfc, and other empirically-determined parameters.

Figure 4:
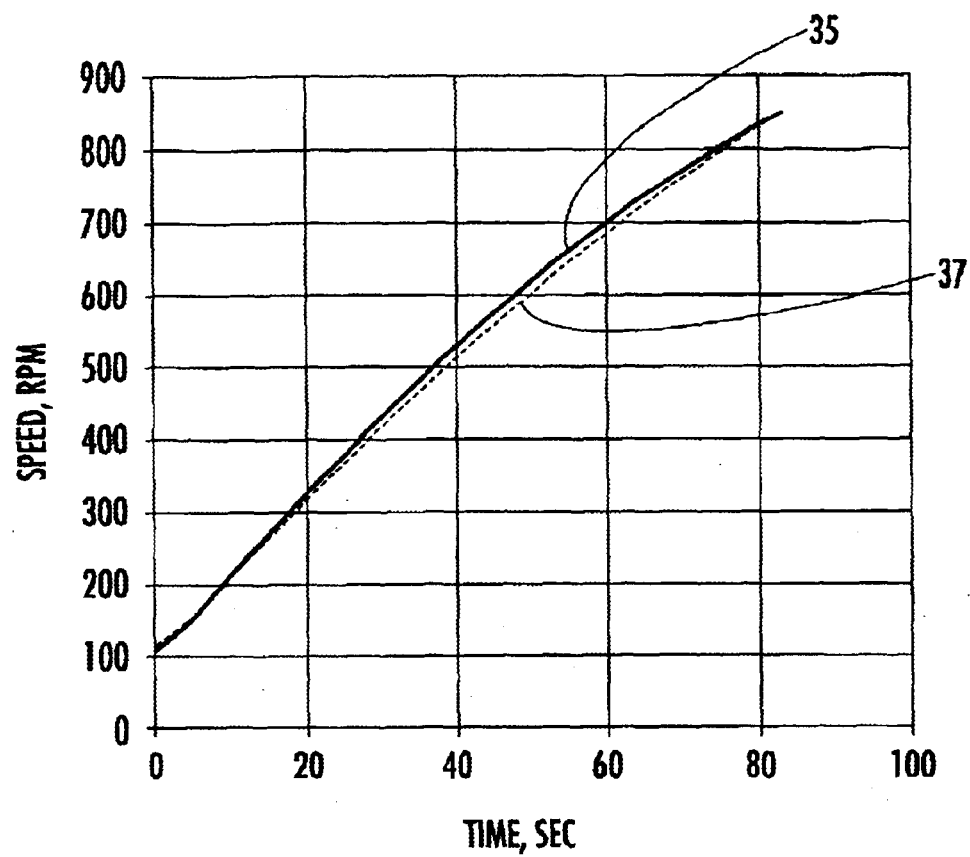
FIG. 4 is a plot of actual rotational speeds of a generator shaft versus time during test starting and a plot of calculated rotational speeds versus time representative of the values used according to the present invention.

Appropriate parameters were obtained from the test results and a simulation was performed using the parameters so described. The simulation and the original test results are illustrated in FIG. 4. The calculated speed-time curve 37 shown in FIG. 4 appears to replicate the actual test (Curve 35) with sufficient accuracy, the differences primarily being attributable to the aforementioned second order effects, which were neglected.

The simulation was then adjusted for the use of an air-cooled generator, for which a brushless exciter can be provided, and substitution of a brushless exciter for the static excitation system. The exciter substitution was performed by making the quantity Irotor in the Ei relationship a function of rotor speed. This exciter has the characteristic that, with maximum exciter excitation, it can supply one-third of generator no-load field current (IFNL) at 100 rpm, increasing to 100% of IFNL at 300 rpm. During the starting process for generators of this size, generator field current is customarily limited to 100% to 120% of IFNL to avoid overheating the rotor field winding in areas with poor low-speed ventilation. The generator substitution required adjustments in the terminal voltage and an adjustment in the rotor shaft inertia. The current supplied by the SFC (30% of rated SFC current, for this case) was kept constant for two of the cases and allowed to increase to 50% for a third simulation.

Figure 5:
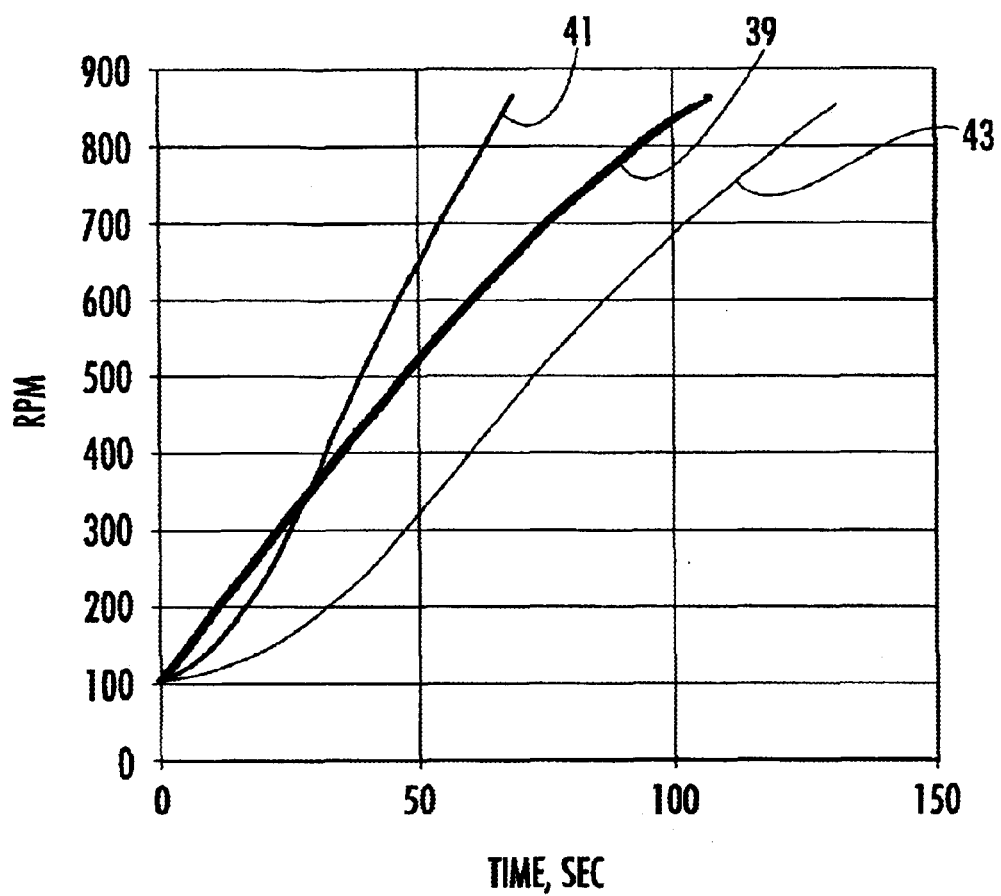
FIG. 5 is a set of plots showing start times using a static exciter starting system and brushless excitation starts representative of the values used according to the present invention.

A comparison of the three simulations is given in FIG. 5. As shown, starting using a static exciter starting system (SES) was simulated (Curve 39) and compared with simulated brushless excitation starts using, respectively, 50% SFC current (Curve 41) and 30% SFC current (Curve 43). Although the use of a brushless exciter roughly doubles the amount of time required to go from 100 rpm to 300 rpm (where the rotor currents were the same), the performance using the brushless and static excitation systems is almost identical above this level. The increase in starting time is only about 25 seconds, and the use of a somewhat higher level of SFC current (to 50% of nominal) would have reduced the starting time to less than that of the same starting system with a static excitation system. Since continuous SFC currents are normally based upon the requirements of the starting system for high speeds (post-ignition), not for low-speed acceleration (which is limited by mechanical considerations), it appears that the performance of the starting system with the brushless exciter could be made very comparable to that of the starting system employed with a static excitation system.

These simulations demonstrate that the technique described here can be used to start a combustion turbine generator with a brushless exciter using the generator as a starting motor with a Static Frequency Converter (SFC) supplying generator stator current and the brushless exciter supplying generator field current. Although the scheme may be a bit slower than a scheme employing static excitation with the same SFC current, it appears possible to approach the speed of static start with static excitation by optimizing the equipment parameters and usage. For generators using brushless excitation as their conventional means of excitation, the brushless exciter scheme should be considerably cheaper than other starting alternatives for static start.

Figure 6:
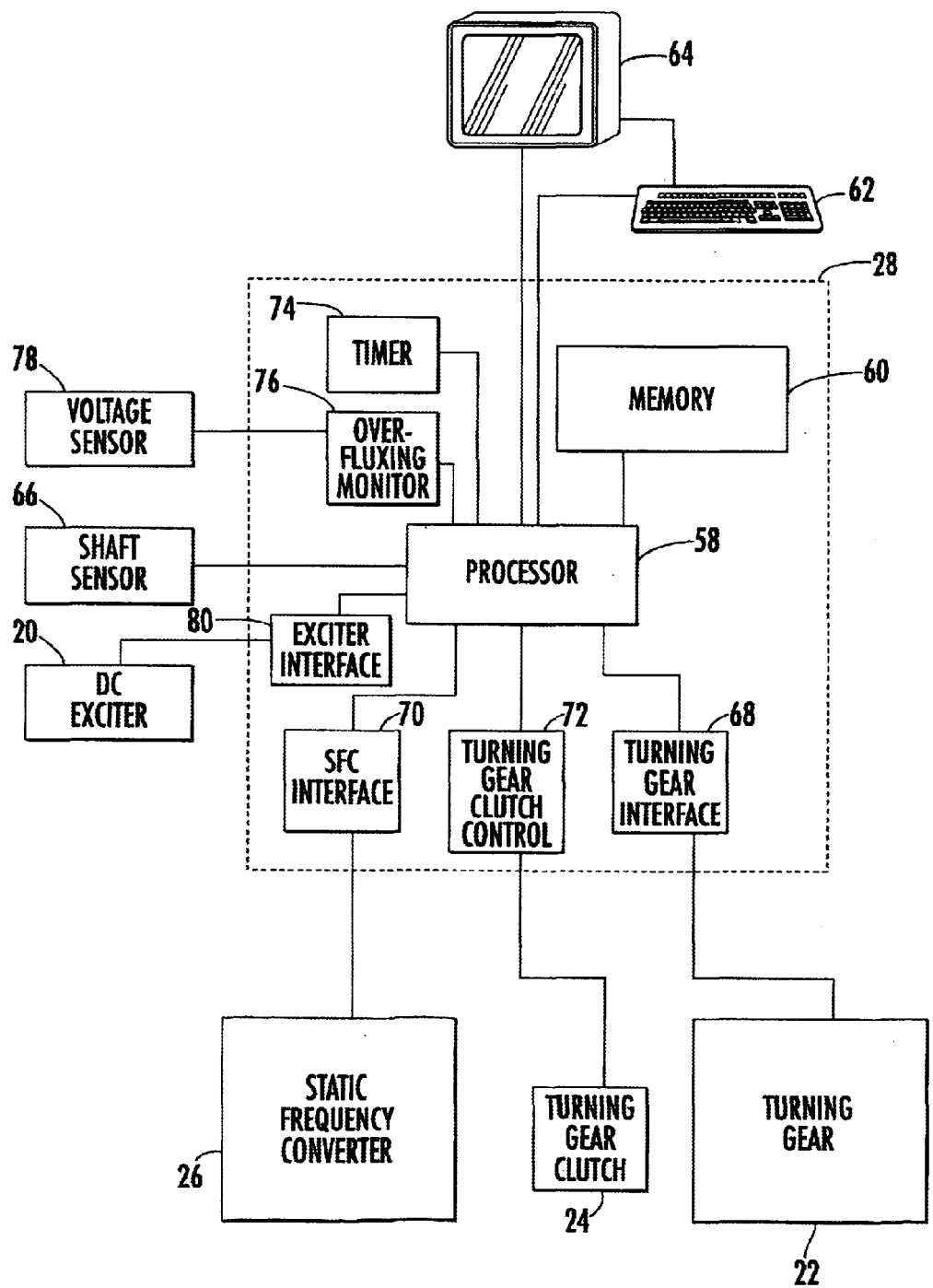
FIG. 6 is a more detailed schematic view of a controller of the combustion turbine power generator shown in FIG. 1.

Referring now additionally to FIG. 6, a combustion turbine power generator 10 configured to implement the above-described methods in accordance with the invention is now described. In addition to elements already described—shaft 12, turbine 14, rotor 16, stator 18, exciter 20, turning gear 22, and stator power supply 26—the combustion turbine power generator 10 also illustratively includes a starting controller 28. The starting controller 28 is connected to the turning gear 22 and stator power supply 26.

The starting controller 28 illustratively includes a processor 58 and a memory 60 connected to the processor. The starting controller 28 is connected to input/output devices in which instructions are entered with a keyboard 62 and data is displayed to a user via a display screen 64.

The starting controller 28 also illustratively includes a shaft sensor 66 connected to the processor 58 to indicate the rotational speed of the shaft 12. Monitoring the rotation of the shaft 12 also monitors the rotational speed of the turning gear 22. The starting controller 28, alternately, though, may include a turning gear sensor in addition to or in lieu of the shaft sensor 66.

In addition, the starting controller 28 also illustratively includes a turning gear interface 68 connected between the processor 58 and the turning gear 22. The processor 53 via the turning gear interface 68 controls the rotational speed of the turning gear 22. As noted above, the turning gear 22 typically has a nominal speed for turning the shaft when the turbine power generator 10 is not operating, and an upper rotational speed at which the shaft is driven to rotate the armature 30 of the DC-field exciter 20 to supply DC electrical power to the stator 18. During starting, therefore, the shaft sensor 66 monitors the rotational speed of the shaft 12 and the processor 58 via the turning gear interface 68 causes the turning gear 22 to increase the rotational speed of the shaft 12 up to the upper rotational speed.

The starting controller 28 also causes the stator power supply 26 to supply electrical power to the stator 18 when the shaft 12 drives the rotor 16 at the upper rotational speed. Accordingly, the starting controller 28 illustratively includes a stator power supply interface 70 connected between the processor 58 and the stator power supply 26. The processor 58 via the stator power supply interface 70 causes the stator power supply 26 to supply electrical power to the stator 18.

The starting controller 28 also illustratively includes a turning gear clutch control 72 connected between the processor and the turning gear clutch 24 to disengage the turning gear 22 from the shaft 12 after the stator power supply supplies electrical power to the stator 18. In addition, the starting controller 28 illustratively includes a timer 74 connected to the processor 58 to permit the starting controller 28 to suspend starting unless the shaft 12 reaches the starting rotational speed by a maximum start time. Also, the starting controller 28 illustratively includes an overvoltage monitor 76 to connected to the processor 58 and a voltage sensor 78 to monitor a voltage of the stator 18. The processor-controlled supply of power from the stator power supply 26 to the stator 18 is reduced if necessary to reduce the likelihood of an overvoltage condition in the stator 18.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A method for starting a combustion turbine power generator comprising a shaft, a combustion turbine for driving the shaft when operating and having a starting rotational speed, a rotor connected to the shaft, a stator surrounding the rotor, a DC-field exciter comprising an armature and rotating rectifier connected to the shaft, a DC-field winding surrounding the armature and a turning gear for rotating the shaft, the method comprising:

configuring the combustion turbine power generator so that the rotor is connected to receive all DC electrical power from the rotating rectifier of the Dc-field exciter;

rotating the shaft with the turning gear to cause the Dc-field exciter to provide DC electrical field power to the generator rotor; and supplying variable-frequency and variable-voltage electrical power to the stator as the shaft is rotating so that the stator cooperates with the rotor to operate as a motor to increase a rotational speed of the shaft up to the starting rotational speed of the combustion turbine;

wherein the turning gear has a nominal rotational speed and an upper rotational speed; and wherein rotating the shaft with the turning gear comprises increasing the rotational speed of the shaft from the nominal rotational speed to the upper rotational speed;

wherein supplying electrical power to the stator is performed upon reaching the upper rotational speed from the turning gear; and disengaging the turning gear substantially concurrently with starting to supply electrical power to the stator.

2. A method according to claim 1 wherein configuring comprises configuring the rotor to be devoid of brushes or slip rings.

3. A method according to claim 1 wherein the combustion turbine has a maximum start time; and wherein supplying electrical power to the stator comprises supplying electrical power so that the shaft reaches the starting rotational speed before the maximum start time.

4. A method according to claim 1 wherein the DC-field exciter comprises a brushless DC-field exciter.

5. A method according to claim 1 further comprising supplying electrical power to the field of the DC-field exciter.

6. A method according to claim 1 wherein supplying electrical power to the stator comprises supplying electrical power from a static frequency converter.

7. A method for starting a combustion turbine power generator comprising a shaft, a combustion turbine for driving the shaft when operating add having a starting rotational speed, a rotor connected to the shaft, a stator surrounding the rotor, a DC-field exciter comprising an armature connected to the shaft and a field surrounding the armature so that the rotor is connected to receive all DC electrical power from the armature of the DC-field exciter, and a turning gear for rotating the shaft between a nominal rotational speed and an upper rotational speed, the method comprising:

rotating the shaft with the turning gear to the upper rotational speed thereof to cause the DC-field exciter to provide all of the DC electrical power to the rotor upon reaching the upper rotational speed, supplying electrical power to the stator as the shaft is rotating so that the stator cooperates with the rotor to operate as a motor to increase a rotational speed of the shaft up to the starting rotational speed of the combustion turbine; and disengaging the turning gear after supplying electrical power to the stator.

8. A method according to claim 7 wherein the combustion turbine has a maximum start time; and wherein supplying electrical power to the stator comprises supplying electrical power so that the shaft reaches the starting rotational speed before the maximum start time.

9. A method according to claim 7 wherein the DC-field exciter comprises a brushless DC-field exciter.

10. A method according to claim 7 further comprising supplying electrical power to the field of the DC-field exciter.

11. A method according to claim 7 wherein supplying electrical power to the stator comprises supplying electrical power to avoid an overvoltage condition of the stator.

12. A method according to claim 7 wherein supplying electrical power to the stator comprises supplying electrical power from a static frequency converter.

13. A combustion turbine power generator comprising:

a shaft;

a combustion turbine for driving said shaft when operating and having a staring rotational speed;

a rotor connected to said shaft;

a stator surrounding said rotor;

a DC-field exciter comprising an armature connected to said shaft and a field surrounding said armature, supplying a rotating rectifier, said rectifier connected to said rotor to supply all DC electrical power thereto;

a turning gear for rotating said shaft;

a stator power supply for supplying variable frequency and magnitude electrical power to said stator; and a starting controller connected to said turning gear and said stator power supply for controlling said turning gear to rotate said shaft so that said Dc-field exciter provides all of the DC electrical power to said rotor, and controlling said stator power supply to supply electrical power to said stator as said shaft is rotating so that said stator cooperates with said rotor to operate as a motor to increase a rotational speed of said shaft up to the starting rotational speed of said combustion turbine;

wherein the turning gear has a nominal rotational speed and an upper rotational speed; and wherein starting controller causes the shaft to be rotated with the turning gear and the rotational speed of the shaft to be increased from the nominal rotational speed to the upper rotational speed;

wherein the stator power supply supplies electrical power to the stator upon the shaft reaching the upper rotational speed; and wherein the turning gear disengages the shaft substantially concurrently with the stator power supply starting to supply electrical power to the stator.

14. A combustion turbine power generator according to claim 13 wherein the rotor is devoid of brushes or slip rings.

15. A combustion turbine power generator according to claim 13 wherein the combustion turbine has a maximum start time; and wherein said starting controller causes the turning gear to rotate the shaft, and the stator power supply supplies electrical power to the stator so that the shaft reaches the starting rotational speed before the maximum start time.

16. A combustion turbine power generator according to claim 13 wherein the DC-field exciter comprises a brushless DC-field exciter.

17. A combustion turbine power generator according to claim 13 wherein the stator power supply is a static frequency converter.

* * * * *